US008939295B2

(12) United States Patent
Ward et al.

(10) Patent No.: US 8,939,295 B2
(45) Date of Patent: Jan. 27, 2015

(54) MULTI-LAYER, FLUID TRANSMISSIVE FIBER STRUCTURES CONTAINING NANOFIBERS AND A METHOD OF MANUFACTURING SUCH STRUCTURES

(75) Inventors: Bennett C. Ward, Midlothian, VA (US); Geoffrey M. Stoltz, Chester, VA (US)

(73) Assignee: Essentra Porous Technologies Corp., Colonial Heights, VA (US)

( * ) Notice: Subject to any disclaimer, the term of this patent is extended or adjusted under 35 U.S.C. 154(b) by 932 days.

(21) Appl. No.: 12/706,729

(22) Filed: Feb. 17, 2010

(65) Prior Publication Data

US 2010/0206803 A1    Aug. 19, 2010

Related U.S. Application Data

(60) Provisional application No. 61/153,104, filed on Feb. 17, 2009.

(51) Int. Cl.
*B01D 39/16* (2006.01)
*B29C 65/02* (2006.01)
(Continued)

(52) U.S. Cl.
CPC ............ *B01D 39/1623* (2013.01); *B01D 39/14* (2013.01); *B01D 39/08* (2013.01);
(Continued)

(58) Field of Classification Search
CPC .......... B01D 2239/065; B01D 39/14–39/1623; B01D 39/163; B01D 2201/182–2201/184; B01D 2201/188; B01D 2201/32; B01D 39/08; B01D 39/083; B01D 39/086; B01D 69/12; B01D 69/125; B01D 2325/40; B32B 5/00; B32B 5/028; B32B 5/04; B32B 5/06; B32B 5/08; B32B 5/10; B32B 5/12; B32B 5/14; B32B 5/142; B32B 5/145; B32B 5/147; B32B 5/26; B32B 7/045; B32B 7/10; B32B 2250/03; B32B 2250/04; B32B 2250/05; B32B 2250/20; B32B 2250/24; B32B 2250/40; B32B 2250/42; B32B 2250/44; B32B 2260/021
USPC ......... 210/503, 504, 505, 508, 488–490, 320, 210/329, 512, 527; 55/512, 527, 528, 55/485–489; 442/43, 45, 46, 47, 49, 164, 442/165, 166, 167, 168, 169, 170, 171, 172, 442/1, 78, 179, 180, 321, 322, 323, 324, 442/326, 327, 415, 416
See application file for complete search history.

(56) References Cited

U.S. PATENT DOCUMENTS 3,251,475 A * 5/1966 Till et al. ................. 210/508
(Continued)

FOREIGN PATENT DOCUMENTS

JP    2007301436    11/2007
(Continued)

OTHER PUBLICATIONS

Graham et al., *Incorporation of Electrospun Nanofibers into Functional Structures*, Presented at INTC 2003, sponsored by INDA, Association of the Nonwoven Fabrics Industry and TAPPI, Technical Association of the Pulp & Paper Industry, Sep. 15-18, 2003, Baltimore, Maryland, pp. 1-16.
(Continued)

*Primary Examiner* — Allison Fitzsimmons
(74) *Attorney, Agent, or Firm* — Don J. Pelto, Esquire; Sheppard, Mullin, Richter & Hampton LLP

(57) ABSTRACT

A multi-layer, fluid transmissive structure is provided that comprises first and second fiber layers each comprising a plurality of polymeric fibers bonded to each other at spaced apart contact points. The polymeric fibers of these fiber layers have diameters greater than one micron and collectively define interconnected interstitial spaces providing tortuous fluid flow paths through the first and second fiber layers. The structure also comprises a plurality of nanofibers disposed intermediate at least a portion of the first fiber layer and at least a portion of the second fiber layer.

11 Claims, 5 Drawing Sheets

(51) Int. Cl.

| | | |
|---|---|---|
| *B29C 65/00* | (2006.01) | |
| *B01D 15/00* | (2006.01) | |
| *B01D 39/14* | (2006.01) | |
| *B01D 39/08* | (2006.01) | |
| *B29C 65/10* | (2006.01) | |
| *B29C 65/18* | (2006.01) | |
| *B29C 65/50* | (2006.01) | |
| *B29K 23/00* | (2006.01) | |
| *B29K 67/00* | (2006.01) | |
| *B29K 75/00* | (2006.01) | |
| *B29K 77/00* | (2006.01) | |
| *B29K 101/12* | (2006.01) | |
| *B29K 105/00* | (2006.01) | |
| *B29K 105/04* | (2006.01) | |
| *B29K 105/06* | (2006.01) | |
| *B29K 105/08* | (2006.01) | |
| *B29K 223/00* | (2006.01) | |
| *B29L 9/00* | (2006.01) | |
| *B29L 31/14* | (2006.01) | |
| *B32B 37/10* | (2006.01) | |

(52) U.S. Cl.
CPC ............ *B01D 39/086* (2013.01); *B01D 39/083* (2013.01); *B01D 2239/0208* (2013.01); *B01D 2239/0225* (2013.01); *B01D 2239/0233* (2013.01); *B01D 2239/025* (2013.01); *B01D 2239/0613* (2013.01); *B01D 2239/0622* (2013.01); *B01D 2239/065* (2013.01); *B01D 2239/0654* (2013.01); *B01D 2239/0668* (2013.01); *B01D 2239/086* (2013.01); *B01D 2239/1208* (2013.01); *B01D 2239/1216* (2013.01); *B29C 65/02* (2013.01); *B29C 65/10* (2013.01); *B29C 65/18* (2013.01); *B29C 65/5035* (2013.01); *B29C 66/45* (2013.01); *B29C 66/729* (2013.01); *B29C 66/83413* (2013.01); *B29K 2023/00* (2013.01); *B29K 2023/06* (2013.01); *B29K 2023/0633* (2013.01); *B29K 2023/12* (2013.01); *B29K 2067/00* (2013.01); *B29K 2067/006* (2013.01); *B29K 2075/00* (2013.01); *B29K 2077/00* (2013.01); *B29K 2101/12* (2013.01); *B29K 2105/0085* (2013.01); *B29K 2105/04* (2013.01); *B29K 2105/06* (2013.01); *B29K 2105/0854* (2013.01); *B29K 2223/00* (2013.01); *B29K 2313/00* (2013.01); *B29L 2009/00* (2013.01); *B29L 2031/14* (2013.01); *B32B 37/10* (2013.01); *B32B 2305/20* (2013.01); *B32B 2309/08* (2013.01); *B32B 2309/105* (2013.01); *B29C 65/5014* (2013.01)
USPC ...... 210/503; 210/500.27; 210/505; 210/320; 210/329; 210/527; 442/43; 442/45; 442/46; 442/47; 442/49; 442/164; 442/165; 442/166; 442/167; 442/168; 442/169; 442/170; 442/171; 442/172; 442/178; 442/179; 442/180; 442/321; 442/322; 442/323; 442/324; 442/326; 442/327; 442/415; 442/416

(56) References Cited

U.S. PATENT DOCUMENTS

| | | | |
|---|---|---|---|
| 4,650,506 | A | 3/1987 | Barris et al. |
| 4,661,255 | A * | 4/1987 | Aumann et al. ............... 210/491 |
| 5,419,953 | A | 5/1995 | Chapman |
| 5,607,766 | A | 3/1997 | Berger |
| 5,620,641 | A | 4/1997 | Berger |
| 5,633,082 | A | 5/1997 | Berger |
| 5,702,616 | A | 12/1997 | Degen et al. |
| 6,103,181 | A | 8/2000 | Berger |
| 6,302,934 | B1 | 10/2001 | Nabata et al. |
| 6,330,883 | B1 | 12/2001 | Berger |
| 6,698,880 | B1 | 3/2004 | Campbell et al. |
| 6,743,273 | B2 | 6/2004 | Chung et al. |
| 6,746,517 | B2 | 6/2004 | Benson et al. |
| 6,840,692 | B2 | 1/2005 | Ward et al. |
| 7,387,700 | B2 | 6/2008 | Tanaka et al. |
| 2002/0013112 | A1 | 1/2002 | Bontaites et al. |
| 2003/0080050 | A1* | 5/2003 | Aune et al. ..................... 210/496 |
| 2005/0026526 | A1* | 2/2005 | Verdegan et al. ............. 442/340 |
| 2006/0060085 | A1 | 3/2006 | Ptak et al. |
| 2006/0096932 | A1* | 5/2006 | Dema et al. .................... 210/767 |
| 2006/0137317 | A1 | 6/2006 | Bryner et al. |
| 2007/0289920 | A1* | 12/2007 | Baker et al. .................... 210/505 |
| 2008/0026041 | A1* | 1/2008 | Tepper et al. .................. 424/445 |
| 2008/0086992 | A1 | 4/2008 | Walz |
| 2008/0110342 | A1 | 5/2008 | Ensor et al. |
| 2008/0160856 | A1* | 7/2008 | Chen et al. ..................... 442/341 |
| 2008/0217241 | A1 | 9/2008 | Smithies et al. |
| 2008/0217807 | A1 | 9/2008 | Lee et al. |
| 2008/0264259 | A1 | 10/2008 | Leung |
| 2008/0302072 | A1 | 12/2008 | Hassmann et al. |
| 2008/0307971 | A1 | 12/2008 | Horie et al. |
| 2009/0026137 | A1 | 1/2009 | Chen et al. |
| 2009/0031683 | A1 | 2/2009 | Schultink et al. |
| 2009/0211211 | A1 | 8/2009 | Schultink et al. |
| 2009/0249956 | A1 | 10/2009 | Chi et al. |

FOREIGN PATENT DOCUMENTS

| | | |
|---|---|---|
| JP | 2008-95266 | 4/2008 |
| JP | 2009006272 | 1/2009 |
| JP | 2009-028617 | 2/2009 |
| WO | WO 2007054040 | 5/2007 |

OTHER PUBLICATIONS

International Search Report and the Written Opinion of the International Searching Authority for PCT/US10/24347; mailed May 19, 2010; 10 pages.

* cited by examiner

MULTI-LAYER, FLUID TRANSMISSIVE FIBER STRUCTURES CONTAINING NANOFIBERS AND A METHOD OF MANUFACTURING SUCH STRUCTURES

This application claims priority to Provisional Application Ser. No. 61/153,104, filed on Feb. 17, 2009, which is incorporated herein by reference in its entirety.

BACKGROUND OF THE INVENTION

The invention relates generally to the field of bonded polymeric fiber structures and, more particularly, to multi-layer structures having nanofibers embedded in and around the interfaces between layers of bonded microfiber sub-structures. Such structures form very efficient filters for a variety of liquid and gas filtration applications.

In the science of filtration, the achievement of high filtration efficiency and concomitant low pressure drop (or flow resistance) has been quite difficult. In order for a filter to be engineered to provide excellent filtration efficiency of fine particles, either in liquid or gas filtration applications, the pore size of the filtration media must be small in relation to the size of the particles being excluded by the filter. However, conventional filter media, be it fibrous or made of particulate matter (e.g. sintered plastic or metal beads) is typically comprised of components that are of a size either larger than, or on the order of, the particulates being filtered. In such media, one reduces pore size to improve efficiency by increasing filter media thickness. When such filter media are employed, however, the pressure required to force the fluid (either liquid or gas) through the pores of the filter can become quite large, thus limiting the utility of the filter. The use of thicker and heavier media to improve efficiency also has the related disadvantage of low recovery of desired ingredients caught within the filter media, which causes filter media fouling.

One solution has been to form high performance, low pressure drop filters from sintered metal wire, where the metal fibers, typically of stainless steel composition, are constructed in either a woven or non-woven structure. These filters are widely used as final, fine filtration elements in ink jet printing applications, and are generally disposed adjacent the print head. They are used to prevent particles of too large size from fouling the print head, which would lead to clogging and misfires. The metal structure provides an additional benefit in that it is very abrasion resistant, and can withstand rubbing, frictional and other forces most commonly found in ink jet printers when the user installs, removes or changes the ink jet cartridge.

These woven or non-woven stainless steel fine ink filters are typically supplied in sheet or roll form, and are die cut into the desired shape for installation into either the ink jet cartridge or, in the case of printers which have the print head installed in the printer rather than the cartridge, installed in the ink conduit just prior to the print head. In both cases, the manufacturer of either the cartridge or the printer itself must die cut this hard, stainless steel, install it into a housing that is most typically made from a plastic such as polypropylene, and then affix it to the housing in such a manner so that it will be permanently attached and not subject to leakage or loosening. To do this, complex manufacturing methodologies may be employed to form a bond between the metal filter and the plastic housing. There are deficiencies in this manufacturing methodology in that the forces required to die cut the stainless steel filter may be large and the filter installation technologies may be complex and expensive.

There is accordingly a need for a fine filter for ink jet printer fine filtration applications, which has excellent fine particle filtration capability, low pressure drop, excellent abrasion resistance, is readily die cuttable, and is ultrasonically (or otherwise thermally) bondable to the plastic components typically found in ink jet printer construction.

SUMMARY OF THE INVENTION

The present invention provides, in one particular aspect, a multi-layer, fluid transmissive structure comprising a first fiber layer comprising a first plurality of polymeric fibers bonded to each other at spaced apart contact points. The polymeric fibers of the first fiber layer have diameters greater than one micron and collectively define a first plurality of interconnected interstitial spaces providing tortuous fluid flow paths through the first fiber layer. The structure further comprises a second fiber layer adhered to the first fiber layer. The second fiber layer comprises a second plurality of polymeric fibers bonded to each other at spaced apart contact points. The polymeric fibers of the second fiber layer have diameters greater than one micron and collectively define a second plurality of interconnected interstitial spaces providing tortuous fluid flow paths through the second fiber layer. The multi-layer structure also comprises a plurality of nanofibers disposed intermediate at least a portion of the first fiber layer and at least a portion of the second fiber layer.

It is to be understood that both the foregoing general description and the following detailed description are exemplary and explanatory only, and are not restrictive of the invention as claimed. The accompanying drawings, which are incorporated herein by reference, and which constitute a part of the specification, illustrate certain embodiments of the invention and, together with the detailed description, serve to explain the principles of the invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE INVENTION

Figure 1:
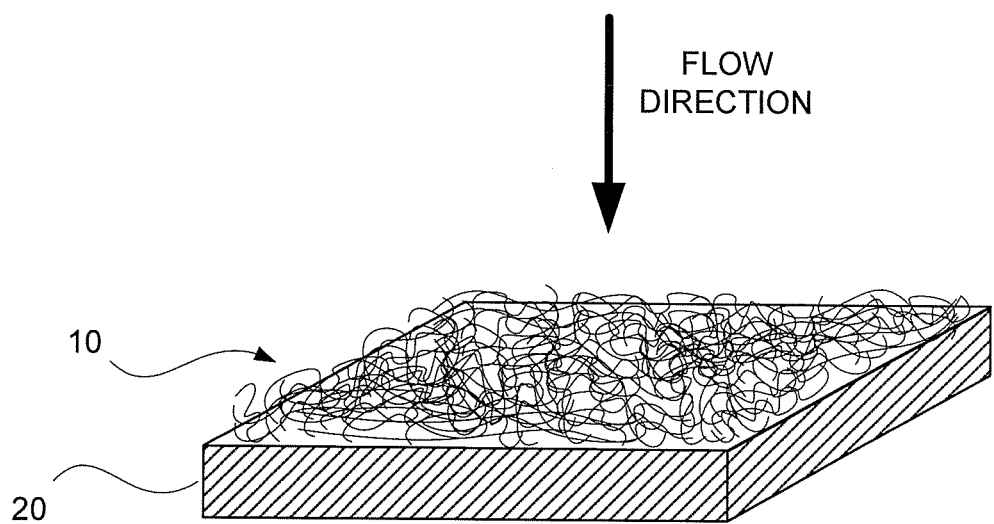
FIG. 1 is a perspective view of a filtration structure in which a layer of nanofibers is reinforced by a downstream layer of backing material.

Reference will now be made in detail to embodiments of the invention, examples of which are illustrated in the accompanying drawings.

The present invention provides multi-layer bonded fiber structures that can be used for high efficiency filtration applications. These structures make use of nanofibers to enhance filtration efficiency without incurring an unacceptable pressure drop.

As used herein, the term "nanofiber" refers to any fiber having a diameter less than or equal to one micron (1000 nanometers). Utilizing electro-spinning techniques well known to those skilled in the art, nanofibers may be produced that have diameters below 500 nanometers.

When filters are constructed utilizing nanofibers as the filtration media, one can positively impact the ratio between filtration efficiency and pressure drop. For example, if filter media of the same porosity is compared during the filtration of fluids with similar sized particles, where one media is comprised of nanofibers with fiber diameters on the order of 100-500 nanometers, and where the other is comprised of microfibers (the term used herein to refer to fibers having diameters in a range of one micron to 100 microns), the media comprised of nanofibers will have better filtration efficiency and lower pressure drop.

Nanofibers, however, have limited structural integrity due to their very small size and, as a result, are subject to tearing and abrasion forces. Some mechanical integrity can be imparted to a nanofiber layer by backing this layer with a substrate material. In filtration applications, such a substrate would itself be a porous material. For example, in the filtration application shown in FIG. 1, a layer of nanofibers 10 is reinforced by a downstream layer of non-woven backing material 20. The backing 20 serves to counter the pressure applied by a fluid during the filtration process. Structures of this type are typically pleated, and are finding increasing use in high performance gas filtration applications, such as HEPA filters, high performance vacuum cleaners, high performance industrial air filters, and the like.

Nanofibers are most often made via electro-spinning techniques, and are typically made by spinning fibers onto a backing that comprising one or more of paper, film and non-woven fabrics made up of conventional fibers. For example, U.S. Pat. No. 6,743,273 (Chung, et. al.) describes such structures and their use in constructing filter media. As described in this patent and in other literature, nanofiber filter media as known in the art may be formed as a layer or web of nanofibers laid down onto a porous backing, preferably comprised of a non-woven fibrous structure, where said non-woven structure may be comprised of fibers with diameters on the order of 10 to 100 microns, or higher. The resulting filter media are essentially two layer structures where the non-woven material serves as a structural support and the nanofiber layer serves as the high efficiency filtration medium.

The two layer structure as described above and depicted in FIG. 1 may have disadvantages. In ink jet filtration application, the currently used metal fiber filters are typically die cut and in use are subject to rubbing, frictional and other forces found when the user installs, removes or changes the ink jet cartridge. If one looks to substitute the metal fiber filter with a two layer structure as depicted in FIG. 1, the act of die cutting and the frictional or rubbing forces found in these applications would be anticipated to damage or otherwise interfere with the exposed nanofiber layer (10 in FIG. 1). It is desired to have a filter that is die cuttable and would also protect the sensitive nanofiber component from frictional or rubbing forces.

The present invention provides self-sustaining, composite bonded fiber structures that incorporate and take advantage of nanofiber filtration characteristics. These structures provide porous fiber layers that are typically formed from microfibers. These outer layers define an entry surface through which a challenge fluid enters the structure and an exit surface through which the challenge fluid exits the structure. The structure also includes a plurality of nanofibers disposed within the interior of the structure. In some embodiments, these nanofibers may form a third fiber layer intermediate the two outer layers, which are bonded to it to form the multi-layer composite structure. In other embodiments, the outer layers may be bonded to each other with the nanofibers disposed around and between the outer layer fibers in the vicinity of the bond interface.

Figure 2:
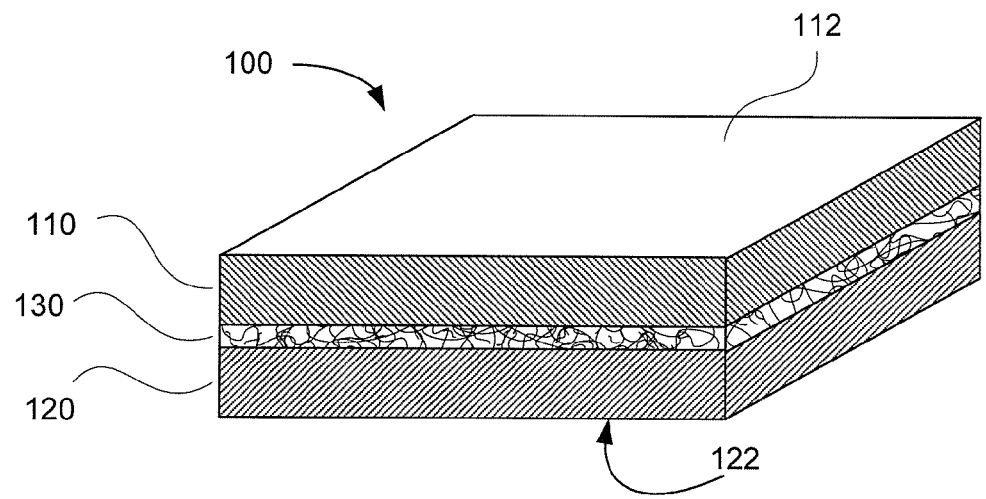
FIG. 2 is a perspective view of a multi-layer, fluid transmissive structure according to an embodiment of the invention.

Embodiments of the invention will now be discussed in more detail. With reference to FIG. 2, a multi-layer composite structure 100 according to an embodiment of the invention has first, second, and third fiber layers 110, 120 and 130 bonded to one another. The first and second fiber layers 110, 120 are bonded fiber structures that define a challenge surface 112 and an exit surface 122. The third fiber layer 130 is a matrix of nanofibers. In a typical filtration application, the first layer 110 could provide an abrasion-resistant challenge-side prefilter, the third layer 130 could provide a low pressure drop fine filter, and the second layer 120 could provide a porous structural backing material.

The bonded fiber structures of the first and second fiber layers 110, 120 may be formed from webs of thermoplastic fibrous material comprising an interconnecting network of highly dispersed continuous and/or staple fibers bonded to each other at paced apart points of contact. As described in U.S. Pat. Nos. 5,607,766, 5,620,641, 5,633,082, 6,103,181, 6,330,883, and 6,840,692 (collectively, "Bonded Fiber Structure Patents"), each of which is incorporated herein by reference in its entirety, such bonded fiber structures may be formed using a wide variety of fiber types and manufacturing methods. Of particular utility are structures made from macrofiber or microfiber webs that are formed into substantially self-sustaining, three-dimensional porous components. The dispersed bonded fibers of these structures define tortuous passages through the structure that can provide very high surface areas and porosity, and may be formed in a variety of sizes and shapes. The polymer materials that can be used to form the fibers may include but are not limited to polyolefins, polyesters, polyurethanes, and polyamides, and copolymers thereof. Particular materials include polyethylene, low density polyethylene, polypropylene, polyethylene terephthalate, polybutylene terephthalate and nylon.

The first and second fiber layers 110, 120 may, in particular, comprise a non-woven microfiber material, which may be carded, air laid, wet laid, melt blown, or other non-woven construction. The fibers may be mono-component or multi-component in nature, and may be bonded to one another by thermal or chemical means to impart strength to the non-woven structure. In a particular embodiment, one or both of the first and second layers may be a carded, through air bonded, non-woven structure comprising sheath-core bicomponent fibers. As used herein, the term "bicomponent fiber" refers to the use of two polymers of different chemical nature placed in discrete cross-sectional areas of the fiber. While other forms of bicomponent fibers are possible, the more common techniques produce either "side-by-side" or "sheath-core" relationships between the two polymers. For example, bicomponent fibers comprising a core of one polymer and a coating or sheath of a different polymer are particularly desirable for many applications since the core material may be relatively inexpensive, providing the fiber with bulk and strength, while a relatively thin coating of a more expensive or less robust sheath material may provide the fiber with unique properties. Sheath materials are often selected for their relative bondability as compared to the more structurally robust core materials.

An exemplary bicomponent fiber that may be used in the structures of the invention is one having a polyethylene sheath material and a polypropylene core material. Other sheath and core polymers may be used and would be well known to those skilled in the art. In some embodiments, the first and second layers 110, 120 may be formed as a melt blown web of bicomponent fibers, which may be calendared or un-calendared. Woven fabrics, articulated films and other porous media could also be employed.

The specific fiber materials of the first and second layers 110, 120 may be chosen to enable facile die cutting, ultrasonic or thermal bondability and/or to provide a relatively large porosity and pore size. The materials of construction are preferably chemically and mechanically resistant to the particular fluid being filtered. As will be discussed, the material and structural characteristics of the first layer 110 may be different from those of the second layer 120 and the characteristics of both may be tailored to particular applications.

The third fiber layer 130 is a web or matrix of nanofibers to which the first and second fiber layers are bonded. These nanofibers may be produced using any method known in the art, but will typically be electro spun or melt blown. Such nanofibers may have a diameter in a range of 50 to 500 nm. In a particular embodiment, the nanofibers have a diameter in a range of 100 to 400 nm, and, in a particularly effective embodiment, are in a range of 150 to 250 nm. The nanofiber web may have pore sizes ranging from 0.1 to 15 microns, and more preferably from 1 to 6 microns as measured during manufacture of the structure 100. The nanofibers of the web may be formed from any suitable material including polyvinylidene fluoride (PVDF), polyamides, polyesters, polyolefins, polyurethanes, polycarbonates, polystyrene, or other polymeric systems. The materials of the third layer 130 are preferably chemically and mechanically resistant to the particular fluid being filtered.

The thickness of the third layer 130 will typically be in a range of 50-5000 nm. In particular embodiments, the thickness will be in a range of 150-1500 nm.

In one particular embodiment, the third layer 130 of the composite structure 100 may be a web of PVDF nanofibers with diameters in a range of 150-250 nm which provide pore sizes in a range of 1 to 6 microns.

Figure 3:
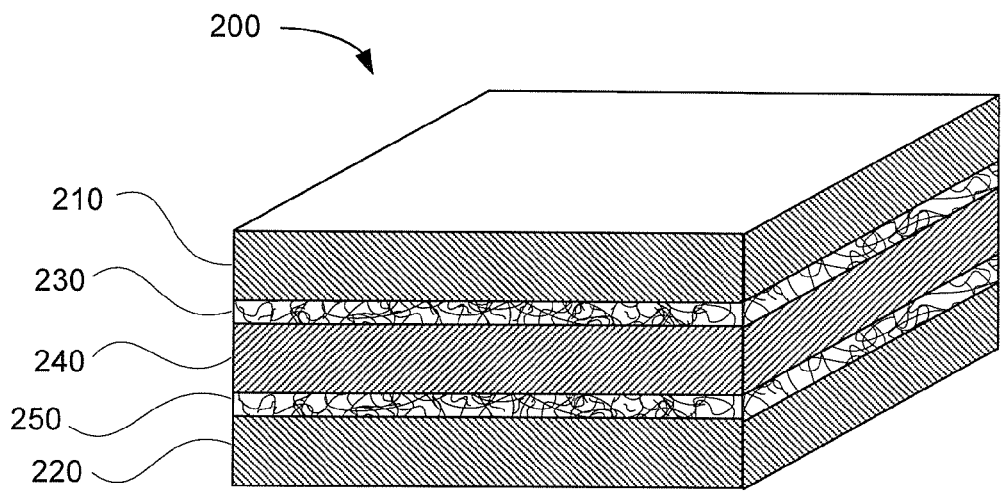
FIG. 3 is a perspective view of a multi-layer, fluid transmissive structure according to an embodiment of the invention.

Multi-layer fiber structures of the type described above are not limited to three or any other particular number of layers so long as the nanofiber layer is bracketed by microfiber of macrofiber layers. With reference to FIG. 3, for example, a composite structure 200 according to an embodiment of the invention has three non-nanofiber layers 210, 220, 240 supporting two nanofiber layers 230, 250. The supporting layers 210, 220, 240 may be any form of bonded fiber material as described above for the outer fiber layers 110, 120 of the structure 100 illustrated in FIG. 2. One, some, or all of the supporting layers 210, 220, 240 may be bonded non-woven fiber materials. The supporting layers 210, 220, 240 may use the same or different fiber materials and/or may have the same or different structural and fluid flow characteristics.

The nanofiber layers 230, 250 may each be a web or matrix of nanofibers to which the supporting layers 210, 220, 240 are bonded. The nanofibers themselves may be produced using any method known in the art, but will typically be electro spun or melt blown. Their size, material and other characteristics may be substantially the same as those described above in relation to the nanofiber layer 130 of the structure 100 illustrated in FIG. 2.

There is no limit to the number of layers that may be used in the multi-layer structures of the invention. In particular applications, the characteristics of these layers may be established so as to provide a desired efficiency profile within the filter. For example, a particular structure may be configured so that the nanofiber layers increase in filtration efficiency in the flow direction through the structure. The multi-layer structures may also include adjacent non-nanofiber layers with no nanofiber layer between them.

In order to provide a cohesive, self-sustaining structure the multi-layer fiber structures described above require that the supporting (i.e., non-nanofiber) layers be bonded to the nanofiber layer(s), typically by thermal bonding. Depending on the materials, however, it can be difficult or impractical to structurally bond the supporting layers to the nanofiber layer(s). Further, the lack of structural integrity of the nanofiber layers themselves may significantly reduce the integrity of the overall composite structure.

Figure 4:
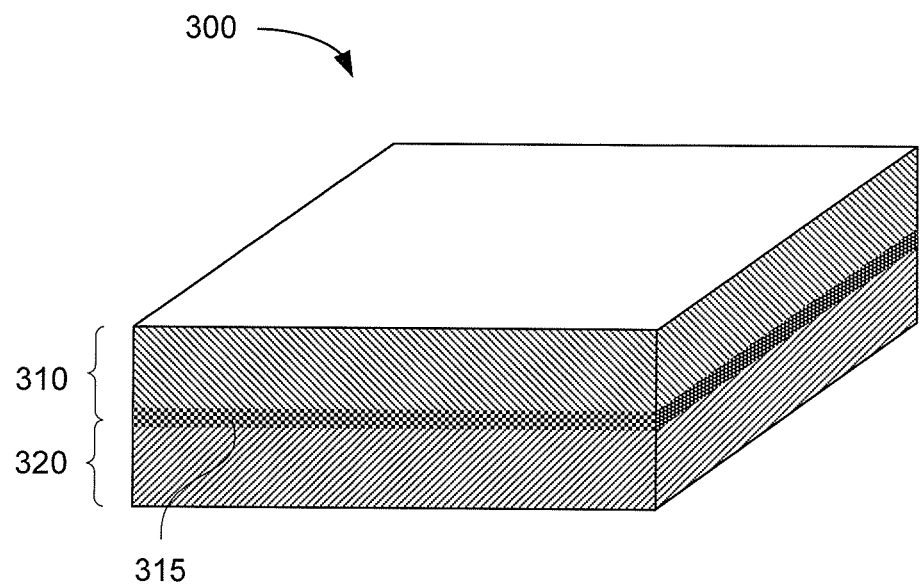
FIG. 4 is a perspective view of a multi-layer, fluid transmissive structure according to an embodiment of the invention.

To address these potential drawbacks, another embodiment of the invention provides self-sustaining, multi-layer bonded fiber structures that incorporate and take advantage of nanofiber filtration characteristics without requiring the use of discrete nanofiber layers to which other layers must be bonded. With reference to FIG. 4, a multi-layer composite structure 300 according to an embodiment of the invention has a first fiber layer 310 bonded to a second fiber layer 320. As will be discussed in more detail hereafter, the composite structure 300 further comprises a plurality of nanofibers interspersed between and among the fibers of the first and second layers 310, 320 in the region 315 where the first and second layers 310, 320 are bonded to one another.

The first and second fiber layers 310, 320 may be formed from a variety of porous materials, including woven, non-woven and sintered polymeric materials. As in the previous embodiments, the first and second fiber layers 310, 320 may be formed from webs of thermoplastic fibrous material comprising an interconnecting network of highly dispersed continuous and/or staple fibers bonded to each other at paced apart points of contact. Of particular utility are structures made from macrofiber or microfiber webs that are formed into substantially self-sustaining, three-dimensional porous components. The dispersed bonded fibers of these structures define tortuous passages through the structure that can provide very high surface areas and porosity, and may be formed in a variety of sizes and shapes. The fibers used to form these structures may be mono-component or multi-component in nature, and may be bonded to one another by thermal or chemical means to impart strength to the structure. Staple and/or continuous fibers may be used.

The first and second fiber layers 310, 320 may each be formed from more than one fiber type, each type imparting different characteristics to the fiber layer. In some embodiments, for example, some of the fibers may be selected primarily for their bonding characteristics.

In a particular embodiment, one or both of the first and second layers may be a carded, through air bonded, non-woven structure comprising sheath-core bicomponent fibers. An exemplary bicomponent fiber that may be used in the structures of the invention is one having a polyethylene sheath material and a polypropylene core material. Other sheath and core polymers may be used and would be well known to those skilled in the art. In some embodiments, the first and second layers 310, 320 may be formed as a melt blown web of bicomponent fibers, which may be calendared or un-calendared. Woven fabrics, articulated films and other porous media could also be employed.

As in previous embodiments, the specific fiber materials of the first and second layers 310, 320 may be chosen to enable facile die cutting, ultrasonic or thermal bondability and/or to provide a relatively large porosity and pore size. The materials of construction are preferably chemically and mechanically resistant to the particular fluid being filtered. The material and structural characteristics of the first layer 310 may be different from those of the second layer 320 and the characteristics of both may be tailored to particular applications.

It will be understood by those of skill in the art that fibrous structures of the type described above may be bonded to one another so that the fibers of one fiber structure are bonded to the fibers of the other structure. This is generally accomplished by heating the surfaces of the structures and pressing them together so that fibers of each layer bond to fibers of the other layer. This results in a porous interface zone that comprises fibers of both structures and connects the tortuous passages of one structure to those of the other structure to allow fluid to pass from one to the other.

In the multi-layer structure 300, the first fiber layer 310 is bonded to the second fiber layer 320 at an interface zone 315. A plurality of nanofibers is disposed within the multi-layer structure at the interface zone 315. The plurality of nanofibers is disposed so that some or all of the nanofibers are positioned within the interstices between the fibers of the first layer 310, the fibers of the second layer 320 or the fibers of both the first and second fiber layers 310, 320. At least a portion of the nanofibers is disposed within the interface zone 315 itself.

Figure 5:
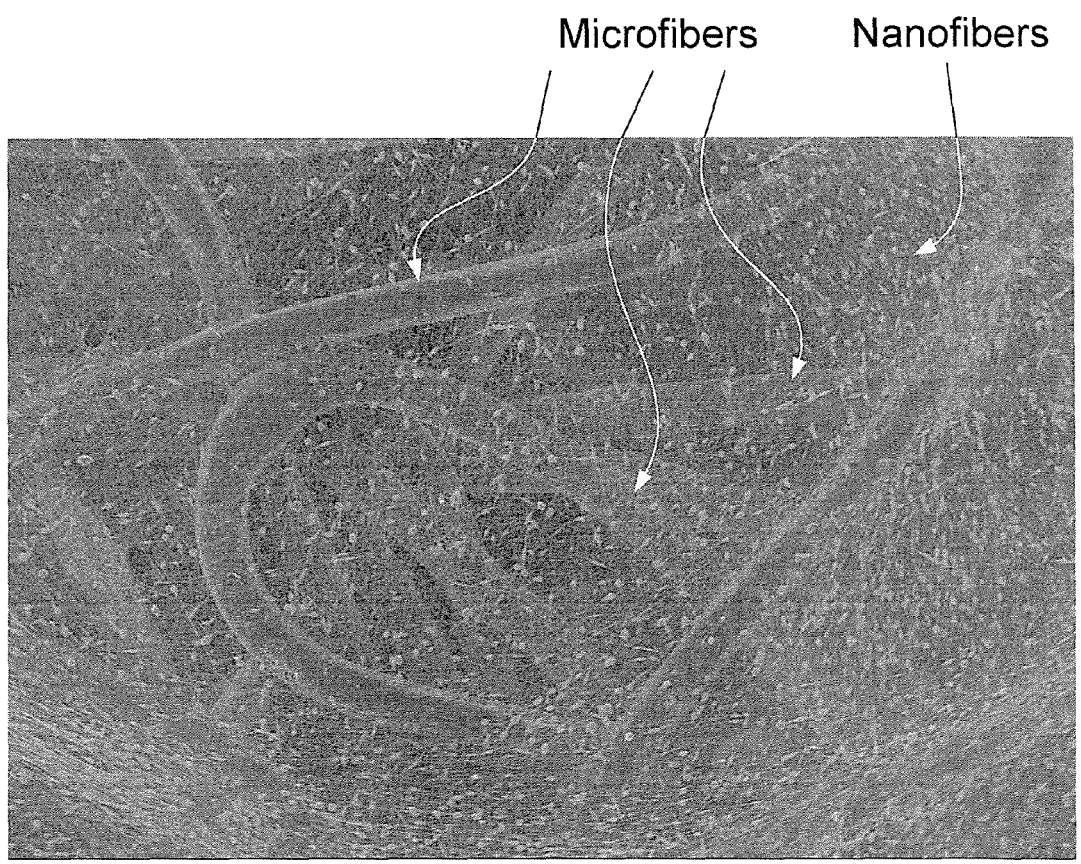
FIG. 5 is SEM micrograph showing the relative size and positioning of microfibers and nanofibers as they would be found in various embodiments of the invention.
Figure 6:
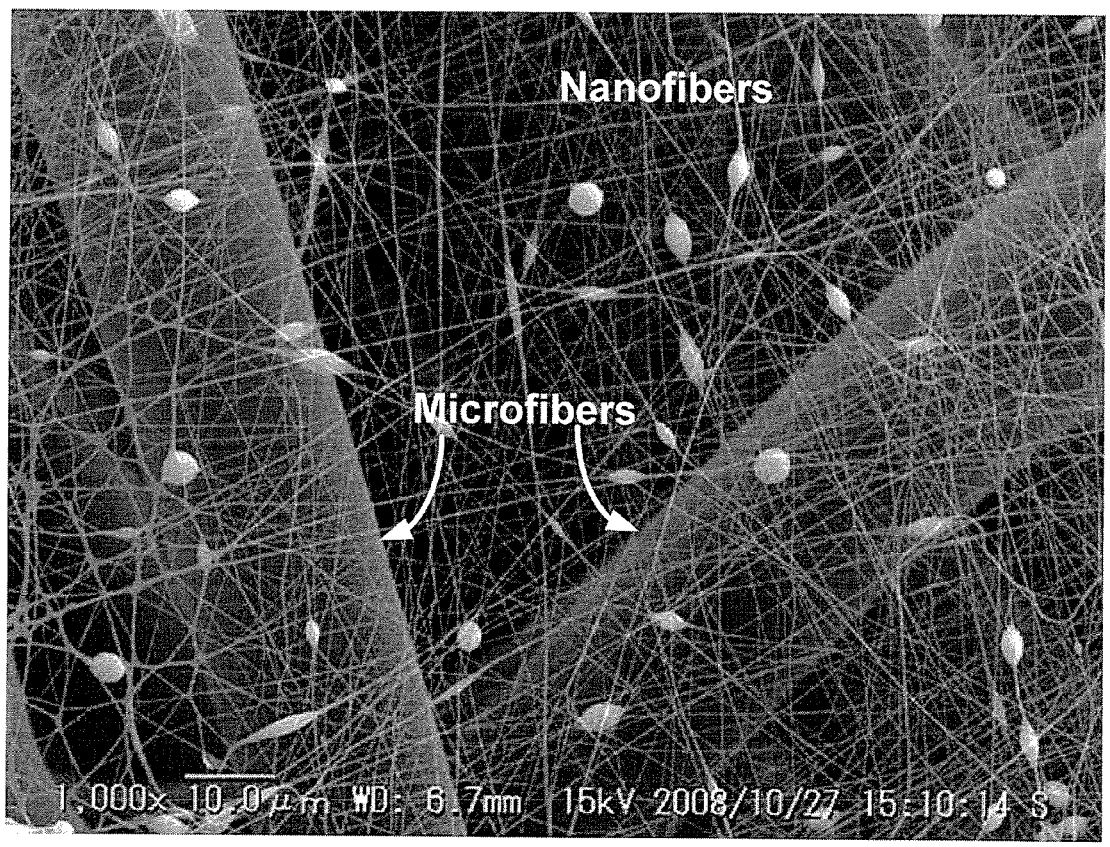
FIG. 6 is SEM micrograph showing the relative size and positioning of microfibers and nanofibers as they would be found in various embodiments of the invention.

FIGS. 5 and 6 are micrographs taken during the manufacturing of a multi-layer structure similar to structure 300. While these micrographs do not illustrate the final multi-layer structure, they do serve to demonstrate the size and positioning of the nanofibers relative to the microfibers of a support layer.

Like the previous embodiments, the multi-layer structure 300 provides three distinct regions through which a challenge fluid may flow. The first region is defined by the flow characteristics of the first fiber layer 310, the second region is defined by the flow characteristics of the interface zone 315 within which nanofibers are disposed, and the third region is defined by the flow characteristics of the second layer 320. Unlike the earlier embodiments, however, the first and second layers 310, 320 are bonded directly to one another through the nanofiber-containing interface zone 315, thereby providing a robust, self-sustaining structure.

Figure 7:
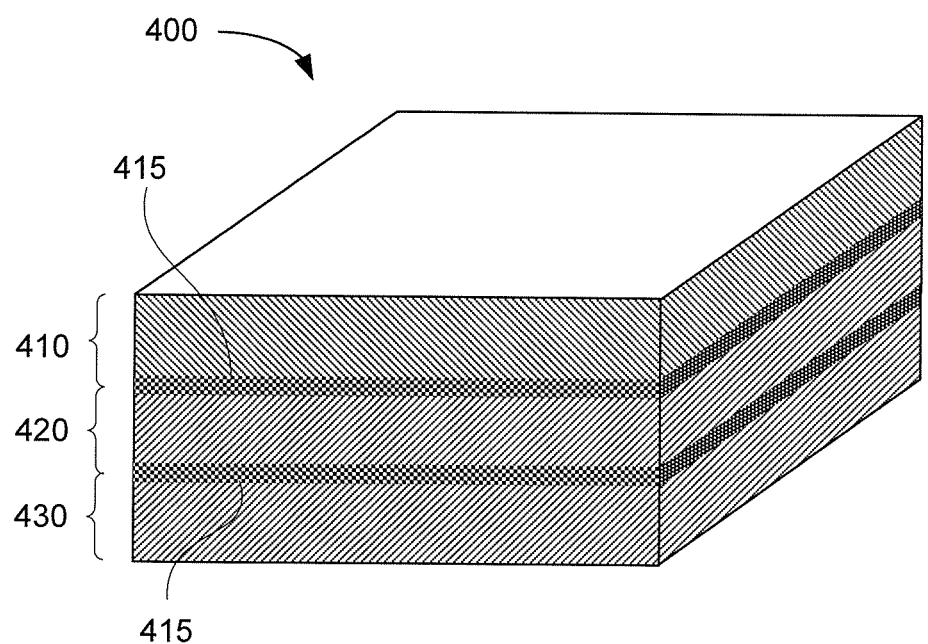
FIG. 7 is a perspective view of a multi-layer, fluid transmissive structure according to an embodiment of the invention.

Multi-layer structures having nanofibers embedded within bonded fiber layers are not restricted to the two supporting layers of the structure 300 of FIG. 4. Any number of support layers may be used and nanofibers may be disposed at the interface between any two support layers. With reference to FIG. 7, for example, a composite structure 400 according to an embodiment of the invention has a first non-nanofiber layer 410 bonded to a second non-nanofiber layer 420 at a first interface zone 415, The second layer 420 is, in turn, bonded to a third non-nanofiber layer 430 at an interface zone 425. The first, second and third layers 410, 420, 430 may be any form of fiber material as described above for the outer fiber layers 110, 120 of the structure 100 illustrated in FIG. 2 or the supporting layers 310, 320 of the structure 300 illustrated in FIG. 4. One, some, or all of the supporting layers 410, 420, 430 may be bonded non-woven fiber materials. The supporting layers 410, 420, 430 may use the same or different fiber materials and/or may have the same or different structural and fluid flow characteristics.

A first plurality of nanofibers is disposed within the multi-layer structure at the first interface zone 415 and a second plurality of nanofibers is disposed within the structure at the second interface zone 425. The nanofibers of the first plurality are disposed so that some or all of the nanofibers are positioned within the interstices between the fibers of the first layer 410, the fibers of the second layer 420 or the fibers of both the first and second fiber layers 410, 420. At least a portion of the nanofibers is disposed within the interface zone 415 itself. The second plurality of nanofibers is similarly disposed with respect to the fibers of the second and third layers 420, 430 at the second interface zone 425. The nanofibers themselves may be produced using any method known in the art, but will typically be electro spun or melt blown. Their size, material and other characteristics may be substantially the same as those described above in relation to the previous embodiments. The two sets of nanofibers may have different materials, size, and flow characteristics.

Again, there is no limit to the number of layers that may be used in this type of multi-layer structure. In particular applications, the characteristics of these layers may be established so as to provide a desired efficiency profile within the filter. For example, a particular structure may be configured so that the nanofiber layers increase in filtration efficiency in the flow direction through the structure. The multi-layer structures may also include adjacent non-nanofiber layers with no nanofiber layer between them.

The multi-layer structures of the invention may be formed using any of several manufacturing approaches. Individual non-nanofiber layers may be separately manufactured using any of the techniques described in the Bonded Fiber Structure Patents or by any other methods known in the art. These layers can then be supplied for use in forming the multi-layer laminates of the invention.

An illustrative method of forming the multi-layer fiber structures of the invention comprises providing a first (non-nanofiber) fibrous material, which will act as a porous base layer for the multi-layer composite structure. A nanofiber web, formed by electro-spinning or melt blowing, is deposited onto the base layer. The nanofiber web may optionally be hot-rolled to better adhere the web to the base layer. A second (non-nanofiber) fibrous material, which acts as a cover layer, is then placed over the nanofiber web. Additional layers may be added by treating the assembled layers as a base layer and repeating the nanofiber and cover layer steps.

In an alternative to depositing directly onto the base layer, the nanofiber web may be spun or melt blown onto backing paper, or other disposable substrate for later removal and placement onto the base layer.

The layered materials are then passed through a heat forming device such as heated calendar rolls. The rolls are heated to a temperature sufficient to permanently bond the three layers together to make a single structure that can be used as a filter element. Alternatively, the materials may be passed through a heated forming die. The heated forming die may use steam or hot air to heat the materials and can be used to form structures having a lower density and higher thickness than can be created on the calendar rolls. Heated dies can also be used to form the structure into desired shapes. In both the heated die and calendar roll methods, heat and pressure are applied so that the fibers of each non-nanofiber layer are bonded to the nanofibers of the web and/or to the fibers of one or more other non-nanofiber layers.

The above-described method can be used to produce multi-layer structures having discrete nanofiber layers to which the outer layers are bonded or multi-layer structures in which the outer layers are bonded to one another with the nanofibers disposed at the interface zone between the bonded outer layers. The former are generally produced using relatively thick or dense nanofiber webs (e.g., webs having a standalone DOP efficiency greater than 95%), while the latter are produced using relatively thin, dispersed webs (e.g., webs having a standalone DOP efficiency less than 50%) that are readily pressed into the interstices between the outer layer fibers and allow the fibers of the base layer to bond to the fibers of the covering layer. As used herein, "DOP Efficiency" refers to a percentage of 0.3 micron DiOctylPhthalate (DOP) particles blocked by the filter. DOP filtration tests use a monodisperse particle of 0.3 micron diameter DOP particles for evaluating the efficiency of depth filters, membrane filters, and other particle-collecting devices. 0.3 micron is used as it is near the most penetrating particle (ie most difficult to filter) size.

EXAMPLES

A web of electrospun PVDF nanofibers was spun onto a backing of a carded, through air bonded non-woven material formed from 4 dtex sheath/core bicomponent microfibers. The sheath polymer was low density polyethylene and the core polymer was polypropylene. The basis weight of the non-woven material (referred to as "Alpha") was 75 grams per square meter. The nanofibers had diameters in a range of 180 to 200 nm. Samples were constructed using two nanofiber web porosities: a web with a porosity of 1.5 μm and a web with a porosity of 5.5 μm. On each of these structures a second nonwoven web Alpha was placed. The materials were then passed through heated calendar rolls, which in both cases provided a well bonded, porous structure.

The 1.5 and 5.5 μm porosity structures were then subjected to filtration testing. A control structure was also tested. This control structure was comprised of meltblown bicomponent microfibers with a core of polypropylene and a sheath of nylon/polyethylene glycol copolymer, with a fiber size of 15-20 μm and a porosity of 0.8 μm.

Two filtration tests were conducted: The first was "Clean Air Permeability per ISO 4022 (1987)", in which the laminates were placed in a test chamber and air was passed at a flow rate of 3 liters per minute/cm2 through a test area of 9.44 cm2. The differential pressure in mm water was recorded. The results are found in Table 1.

TABLE 1

Clean Air Permeability per ISO 4022 (1987)

| Media Tested | Differential Pressure (mm H$_2$O) |
|---|---|
| 1.5 μm Nano composite | 95 |
| 5.5 μm Nano composite | 60 |
| 0.8 μm Non-woven | 250 |

The second test was a simulated ink particulate removal test, entitled "Initial Retention Efficiency per ASTM F795-88". The fluid tested was a solution of glycerin and water with a viscosity of 2 cps. Flow was recorded at a differential pressure of 110±10 mm water. The contaminate was a PTF Fine Test Dust 12013-1 A2, with particles measuring 3-4, 4-5, 5-8, 8-10, and >10 microns. Laminate sheets were cut into 90 mm diameter discs, which were placed into the test fixture and tested. The results are found in Table 2.

TABLE 2

Initial Retention efficiency per ASTM F795-88

| Media Tested | Flow @ 110 mm H2O diff pres. | Particle Filtration Efficiency (%) | | | | |
|---|---|---|---|---|---|---|
| | | 3-4 μm | 4-5 μm | 5-8 μm | 8-10 μm | >10 μm |
| 1.5 μm Nano composite | 29 l/hr | 99.2% | 99.2% | 99.3% | 99.5% | 99.5% |
| 5.5 μm Nano composite | 29 l/hr | 99.6% | 99.7% | 99.7% | 99.7% | 99.8% |
| 0.8 μm Non-woven | 26 l/hr | 19% | 27% | 40% | 66% | 85% |

The data in Tables 1 and 2 show that the laminates containing the nanofiber material have significantly better filtration efficiency, lower pressure drop and improved flow characteristics over a standard non-woven sheet, which has a lower porosity rating than either the nanofiber laminates tested.

In another example, webs of electrospun PVDF nanofibers were spun onto a carded, through air bonded nonwoven material formed from staple fibers having an average length of 40 mm and a denier of 4 dpf at a 75 gsm basis weight. The staple fibers were bicomponent fibers with a low density polyethylene (LDPE) sheath and a polypropylene core. The nanofiber layer was covered with a second non-woven layer substantially similar to the first. The materials were then passed through heated calendar rolls to form the final bonded fiber structure.

Samples were formed using six different nanofiber layer basis weights. Four of these (identified as Basis Wts. 1-4 in Table 3) were used to produce structures in which the non-nanofiber layers were bonded to each other while two (identified as Basis Wts, 5 and 6 in Table 3) were used to produce structures where the non-nanofiber layers were separated by the nanofiber layer. In all cases, the nanofibers had diameters in a range of 180 to 200 nm DOP filtration efficiency and air permeability tests were performed on all samples to assess the relative performance using various nanofiber amounts. The results are shown in Table 3.

TABLE 3

Nanofiber Composite Structure Performance

| Sample | DOP Filtration Efficiency | Air Perm (@125 Pa backpressure) |
|---|---|---|
| Basis Wt 1 | 36.4% | 154.8 cfm |
| Basis Wt 2 | 44.3% | 125.7 cfm |
| Basis Wt 3 | 68.1% | 70.2 cfm |
| Basis Wt 4 | 79.7% | 23.2 cfm |
| Basis Wt 5 (distinct nano layer) | 96.5% | 11.5 cfm |
| Basis Wt 6 (distinct nano layer) | 98.4% | 9.07 cfm |

It will be apparent to those skilled in the art that various modifications and variations can be made in the method, manufacture, configuration, and/or use of the present invention without departing from the scope or spirit of the invention.

What is claimed is:

1. A multi-layer, fluid transmissive structure comprising:
a first fiber layer comprising a first plurality of polymeric fibers bonded to each other at spaced apart contact points, the polymeric fibers having diameters greater than one micron and collectively defining a first plurality of interconnected interstitial spaces providing tortuous fluid flow paths and a first set of flow characteristics through a first portion of the first fiber layer; and
a second fiber layer adhered to the first fiber layer, the second fiber layer comprising a second plurality of polymeric fibers bonded to each other at spaced apart contact points, the polymeric fibers having diameters greater than one micron and collectively defining a second plurality of interconnected interstitial spaces providing tortuous fluid flow paths and a second set of flow characteristics through a first portion of the second fiber layer,
wherein at least a portion of the polymeric fibers in a second portion of the first layer are bonded to at least a portion of the polymeric fibers in a second portion of the second layer to form an interface zone comprising fibers of both the first and second fiber layers, the fibers collectively defining a third plurality of interstitial spaces,
wherein a plurality of nanofibers is disposed within the third plurality of interstitial spaces in the interface zone and wherein the first portion of the first fiber layer and the first portion of the second fiber layer are free of nanofibers, and
wherein the interface zone has a third set of flow characteristics that is different from the first set of flow characteristics and the second set of flow characteristics.

2. A multi-layer, fluid transmissive structure according to claim 1 wherein the plurality of nanofibers includes nanofibers comprising at least one polymer material selected from the group consisting of polyvinylidene fluoride, polyamides, polyesters, polyolefins, polyurethanes, polycarbonates, and polystyrene.

3. A multi-layer, fluid transmissive structure according to claim 1 wherein at least one of the first and second plurality of polymeric fibers includes fibers comprising one or more of polyethylene, low density polyethylene, polypropylene, polyethylene terephthalate, polybutylene terephthalate and nylon.

4. A multi-layer, fluid transmissive structure according to claim 1 wherein the first and second fiber layers each comprise at least one of the set consisting of woven and non-woven polymeric materials.

5. A multi-layer, fluid transmissive structure according to claim 1 wherein at least one of the set consisting of the first and second fiber layers is a bonded nonwoven fiber structure comprising a plurality of sheath-core bicomponent fibers.

6. A multi-layer, fluid transmissive structure according to claim 1 wherein the first portion of the first fiber layer has a first porosity and the first portion of the second fiber layer has a second porosity that is different from the first porosity.

7. A multi-layer, fluid transmissive structure according to claim 1 wherein the nanofibers and the polymeric fibers of the first and second layers in the interface zone collectively define tortuous passages establishing pore sizes in a range of about 1 micron to about 6 microns.

8. A multi-layer, fluid transmissive structure according to claim 1 further comprising:
a third fiber layer adhered to the second fiber layer, the third fiber layer comprising a third plurality of polymeric fibers bonded to each other at spaced apart contact points, the polymeric fibers having diameters greater than one micron and collectively defining a third plurality of interconnected interstitial spaces providing tortuous fluid flow paths and a fourth set of flow characteristics through a first portion of the third fiber layer;
wherein at least a portion of the polymeric fibers in a third portion of the second layer are bonded to at least a portion of the polymeric fibers in a second portion of the third fiber layer to form a second interface zone comprising fibers of both the second and third fiber layers, the fibers collectively defining a fourth plurality of interstitial spaces,
wherein a second plurality of nanofibers is disposed within the fourth plurality of interstitial spaces in the second interface zone, and
wherein the second interface zone has a fifth set of flow characteristics that is different from the second set of flow characteristics and the fourth set of flow characteristics.

9. A multi-layer, fluid transmissive structure according to claim 1 wherein the fibers of the first plurality of polymeric fibers have different characteristics from the fibers of the second plurality of polymeric fibers.

10. A multi-layer, fluid transmissive structure according to claim 1, wherein the interface zone, from a top-most side of the interface zone to a bottom-most side of the interface zone, comprises fibers of both the first and second fiber layers and the plurality of nanofibers.

11. A multi-layer, fluid transmissive structure comprising:
a first fiber layer comprising a first plurality of polymeric fibers bonded to each other at spaced apart contact points, the polymeric fibers having diameters greater than one micron and collectively defining a first plurality of interconnected interstitial spaces providing tortuous fluid flow paths and a first set of flow characteristics through a first portion of the first fiber layer; and
a second fiber layer adhered to the first fiber layer, the second fiber layer comprising a second plurality of polymeric fibers bonded to each other at spaced apart contact points, the polymeric fibers having diameters greater than one micron and collectively defining a second plurality of interconnected interstitial spaces providing tortuous fluid flow paths and a second set of flow characteristics through a first portion of the second fiber layer,
wherein at least a portion of the polymeric fibers in a second portion of the first layer are bonded to at least a portion of the polymeric fibers in a second portion of the second layer to form an interface zone comprising fibers of both the first and second fiber layers, the fibers collectively defining a third plurality of interstitial spaces,
wherein a plurality of nanofibers is disposed within the third plurality of interstitial spaces in the interface zone and wherein the first portion of the first fiber layer and the first portion of the second fiber layer are free of nanofibers such that the plurality of nanofibers in the interface zone is sandwiched between non-nanofiber layers,
wherein the interface zone has a third set of flow characteristics that is different from the first set of flow characteristics and the second set of flow characteristics, and
wherein the first portion of the first fiber layer has a first porosity and the first portion of the second fiber layer has a second porosity that is different from the first porosity.

* * * * *